(12) United States Patent
He et al.

(10) Patent No.: US 10,941,067 B2
(45) Date of Patent: Mar. 9, 2021

(54) SHAPED GLASS ARTICLE AND METHOD FOR PRODUCING SUCH A SHAPED GLASS ARTICLE

(71) Applicant: SCHOTT GLASS TECHNOLOGIES (SUZHOU) CO. LTD., Jiangsu (CN)

(72) Inventors: Feng He, Jiangsu (CN); Ning Da, Jiangsu (CN); Pengxiang Qian, Shanghai (CN)

(73) Assignee: SCHOTT GLASS TECHNOLOGIES (SUZHOU) CO. LTD., Jiangsu (CN)

( * ) Notice: Subject to any disclaimer, the term of this patent is extended or adjusted under 35 U.S.C. 154(b) by 341 days.

(21) Appl. No.: 15/710,141

(22) Filed: Sep. 20, 2017

(65) Prior Publication Data

US 2018/0009697 A1 Jan. 11, 2018

Related U.S. Application Data

(63) Continuation of application No. PCT/CN2015/074682, filed on Mar. 20, 2015.

(51) Int. Cl.
*C03B 23/023* (2006.01)
*C03C 21/00* (2006.01)
(Continued)

(52) U.S. Cl.
CPC .......... *C03B 23/0235* (2013.01); *B32B 17/06* (2013.01); *C03B 23/0302* (2013.01);
(Continued)

(58) Field of Classification Search
CPC ........ Y10T 428/24628; C03B 23/0235; C03B 23/0302; C03B 23/0357; C03C 21/008;
(Continued)

(56) References Cited

U.S. PATENT DOCUMENTS

2010/0119846 A1 5/2010 Sawada
2011/0154861 A1 6/2011 Kishimoto
(Continued)

FOREIGN PATENT DOCUMENTS

CN 102137820 7/2011
CN 102574736 7/2012
(Continued)

OTHER PUBLICATIONS

International Preliminary Report on Patentability dated Sep. 26, 2017 for corresponding PCT/CN2015/074682, 6 pages.
(Continued)

*Primary Examiner* — Donald J Loney
(74) *Attorney, Agent, or Firm* — Ohlandt, Greeley, Ruggiero & Perle, L.L.P.

(57) ABSTRACT

A shaped glass article is provided that is ultrathin, has two surfaces and one or more edges joining the two surfaces, and a thickness between the two surfaces. The shaped ultrathin glass article has at least one curved area with a non-vanishing surface curvature with a minimal curvature radius R if no external forces are applied. A method for producing a shaped glass article is also provided that includes providing an ultrathin glass with two surfaces and one or more edges joining the two surfaces, having a thickness between the two surfaces and shaping the ultrathin glass to a shaped ultrathin glass article by forming at least one curved area having a non-vanishing surface curvature with a minimal curvature radius R if no external forces are applied to the shaped ultrathin glass article.

19 Claims, 5 Drawing Sheets

(51) Int. Cl.
- *C03B 23/03* (2006.01)
- *C03B 23/035* (2006.01)
- *B32B 17/06* (2006.01)
- *C03C 3/093* (2006.01)
- *C03C 3/087* (2006.01)
- *C03C 3/091* (2006.01)
- *C03C 17/23* (2006.01)
- *B32B 17/10* (2006.01)
- *B32B 1/00* (2006.01)

(52) U.S. Cl.
CPC ...... *C03B 23/0307* (2013.01); *C03B 23/0357* (2013.01); *C03C 3/087* (2013.01); *C03C 3/091* (2013.01); *C03C 3/093* (2013.01); *C03C 17/23* (2013.01); *C03C 21/002* (2013.01); *C03C 21/005* (2013.01); *C03C 21/008* (2013.01); *B32B 1/00* (2013.01); *B32B 17/10009* (2013.01); *B32B 17/10082* (2013.01); *B32B 17/10137* (2013.01); *C03C 2217/231* (2013.01); *C03C 2218/34* (2013.01); *Y10T 428/24628* (2015.01)

(58) Field of Classification Search
CPC ..... B32B 1/00; B32B 17/06; B32B 17/10009; B32B 17/10082; B32B 17/10137
See application file for complete search history.

(56) References Cited

U.S. PATENT DOCUMENTS

| | | | | |
|---|---|---|---|---|
| 2011/0281093 | A1* | 11/2011 | Gulati | B32B 37/08 428/213 |
| 2012/0196103 | A1 | 8/2012 | Murashige | |
| 2013/0209751 | A1 | 8/2013 | Zhang | |
| 2014/0050911 | A1 | 2/2014 | Mauro | |
| 2015/0000341 | A1 | 1/2015 | Bisson | |
| 2016/0137550 | A1 | 5/2016 | Murata | |

FOREIGN PATENT DOCUMENTS

| | | |
|---|---|---|
| CN | 102740623 | 10/2012 |
| CN | 103086591 | 5/2013 |
| CN | 103832012 | 6/2014 |
| CN | 103874664 | 6/2014 |
| JP | 2013528561 | 7/2013 |
| JP | 2015013774 | 1/2015 |
| JP | 2015034123 | 2/2015 |
| WO | 2014139147 | 9/2014 |
| WO | 2014196500 | 12/2014 |

OTHER PUBLICATIONS

International Search Report dated Dec. 21, 2015 for corresponding PCT/CN2015/074682, 4 pages.
Written Opinion of the International Searching Authority dated Dec. 21, 2015 for corresponding PCT/CN2015/074682, 5 pages.

* cited by examiner

SHAPED GLASS ARTICLE AND METHOD FOR PRODUCING SUCH A SHAPED GLASS ARTICLE

CROSS REFERENCE TO RELATED APPLICATIONS

This application is a continuation of International Application No. PCT/CN2015/074682 filed Mar. 20, 2015, the entire contents of all of which are incorporated herein by reference.

BACKGROUND

1. Field of Invention

The invention concerns a shaped glass article with two surfaces and one or more edges joining the two surfaces, having a thickness between the two surfaces and at least one curved area. The invention further concerns a method for producing such a shaped glass article and a use of such a shaped glass article. Furthermore, the invention concerns a device with such a shaped glass article laminated to it.

2. Description of Related Art

The market of consumer electronics requires more and more glass articles for e.g. displays of electronic devices that feature a curved surface. Examples include panoramic TV-screens or curved cellular phone displays for increased viewing experience or facilitated handling. Such applications of glass articles require a high degree of precision during shaping since the fatigue lifetime of glasses can be significantly decreased if they need to be bent out of a given shape. Unavoidable inherent defects on the edges or on the surfaces resulting from the processing during production will, after a certain time, lead to glass breakage. When external forces are applied to the glass, e.g. when bending it, tensile stresses are induced on its edges and surfaces which will result in the already present defects to propagate and grow, ultimately causing the glass to break. Even small deflections of the glass from its given shape lead to breakage during lamination or after a short lifetime due to static fatigue. The tolerances for shaped glass articles or corresponding shaping processes are therefore very low i.e. a high-precision shaping is required in order for a stress free application in its given shape. Conventional processes as thermal molding as they are widely used for providing e.g. glass bottles, trays or bowls are therefore not suitable for such glass applications in consumer electronics.

Shaped glasses with the required precision can be obtained by e.g. high-precision thermal bending or slumping. Thermal bending comprises heating a flat glass and pressing it into the desired shape between two molds with high-precision surfaces. In thermal slumping, the heated glass is deformed under the influence of gravity to adapt to an underlying mold. Thermal bending can be assisted by applying e.g. pressure or vacuum. The heating temperature in both cases can be relatively low, typically around 20-30° C. above the transition temperature $T_g$ of the glass. The heating is usually achieved by infrared (IR) heating. The mold or molds are usually made of mechanically polished tungsten carbide with an additional coating in order to ensure the necessary surface quality and precision of the shaped glass. Such molds are expensive and have a limited lifetime, rendering such shaping processes not suitable for mass production.

Easily shapeable plastic materials have been used in order to replace glass. Glasses, however, in many respects are superior to all known plastic materials having e.g. better light transmittance, better hardness and resistance to water vapor and generally better anti-aging performance and are therefore generally preferred.

Consumer electronics also requires thin glass articles to keep minimizing volume and weight of the final product. In addition, it is a constant requirement, in particular in respect of wearable devices as e.g. smart phones or tablets, to provide light and space-saving glass articles with sufficiently high durability which can resist the mechanical stress and impacts during daily use. In view of the desired reduction in volume and weight, there is a demand for thin glass articles which have the necessary strength e.g. for sufficient protection of the underlying components. With decreasing thickness, the glass becomes more fragile and prone to breakage during handling and processing as compared to thicker glasses. It is therefore common to chemically strengthen thin glasses as described in e.g. US 2014/050911 and US 2010/119846. Chemical strengthening or toughening enhances the strength of the glass by exchanging smaller ions in the surface of the glass with larger ions from e.g. a salt bath. The exchanged larger ions in the glass network result in a compressive surface stress in the ion-exchanged surface layer. Typical parameters for describing ion-exchanged glasses are the depth of the layer (DoL) and the resulting surface compressive stress (CS).

SUMMARY

It is an object of the invention to provide a shaped glass article and a method for producing such a shaped glass article, which overcome the disadvantages of the prior art. In particular, it is the object of the invention to provide a shaped glass article which can be easily and cost effectively produced and a method for producing such a shaped glass article. It is another object of the invention to provide a shaped glass article with a wide range of applications, in particular for the use in electronic devices and a method for producing such a shaped glass article. It is a further object of the invention, to provide a shaped glass article that can be laminated out-of-shape with a viable fatigue lifetime and a method for producing such a shaped glass article. Furthermore, it is an object of the invention to provide a device with such a shaped glass article.

The following terminologies and abbreviations are adopted herein.

The term "glass article" is used in its broadest sense to include any object made of glass and/or glass ceramics. As used herein, ultrathin glass refers to glasses and glass articles with a thickness of equal or less than 0.4 mm, unless otherwise specified. The glass compositions are optimized for ultrathin forming and applications requiring ultrathin glasses as e.g. described in WO2014139147 A1.

Compressive stress (CS): the stress that results in the glass network in an e.g. ion-exchanged or thermally annealed surface layer. CS can be measured by the commercially available stress measuring instrument FSM6000 based on an optical principle.

Depth of layer (DoL): the thickness of the glass surface layer where ion-exchange occurs and compressive stress is produced. DoL can be measured by the commercially available stress measuring instrument FSM6000 based on an optical principle. Analogous, the depth of layer can also be defined in the case of surface compressive stress layers produced by other methods as e.g. thermal annealing.

Central tensile stress (CT): the tensile stress that is generated in an interlayer of the glass and counteracts the compressive stress that is generated in the ion-exchanged surface layers of the glass. The CT can be calculated from the measured CS and DoL.

Average breakage strength ($\sigma_{break}$): Average breakage strength herein refers to the average tensile stress of samples of the ultrathin glass upon breakage of the samples. $\sigma_{break}$ can be measured by two point bending tests.

The objects of the invention are solved by a shaped glass article and a method for producing a shaped glass article disclosed herein. Further, the objects of the invention are solved by the use of the shaped glass article.

The shaped glass article according to the invention is ultrathin and has two surfaces and one or more edges joining the two surfaces, and a thickness between the two surfaces. The shaped ultrathin glass article has at least one curved area with a non-vanishing surface curvature with a minimal curvature radius R if no external forces are applied. The curved area thereby preferably is a result of a low-precision forming process i.e. the curvature radius R can substantially deviate form a target radius R', in particular by up to 50%, where R≠R' and the target radius R' is the radius at which the shaped glass article is intended to be applied or is applied as e.g. laminated to a correspondingly curved target or lamination surface. In a preferred embodiment, the curvature radius R deviates from the target radius R' by at least 1%.

The shaped ultrathin glass article according to the invention maintains its shape without application of external stresses or forces. Whereas the curved area generally can be curved in several directions e.g. as a dent or depression in an otherwise flat glass article, the curvature of the at least one curved area is preferably essentially one-dimensional with a preferably essentially constant curvature in one surface direction. An essentially one-dimensional curvature hereby refers to a curvature in one surface direction and essentially no curvature in a direction perpendicular to the surface direction of the curvature as it is e.g. the case in a surface section of an e.g. circular, hyperbolic, parabolic, or arbitrarily shaped cylinder.

It has surprisingly been found that shaped ultrathin glasses with low precision requirements can be widely applied in applications that require a high precision fitting. The invention is based on the insight that, since the force to bend a glass from a given shape to a certain deviating target shape is proportional to the cube of the thickness of the glass, thinner glasses do not need to be precisely shaped and can be bent from a given close-to-final shape into the target shape without significant loss in lifetime due to static fatigue or running the risk of breakage during the bending. This is not possible with thicker glasses as e.g. a bending radius of 50 mm for a 0.5 mm thick flat glass sheet results in a static stress of e.g. approx. 375 MPa which is much higher than the breakage strength of approx. 100 MPa of typical glasses (see FIG. 1 below). Besides the immediate breakage during lamination, glue as e.g. Optical Clear Adhesives (OCA) which can tolerate a tensile strength higher than 375 MPa (or 375 N/mm²) would be needed which is a challenge for most glass glues. Laminating a 0.05 mm thick flat glass sheet to a 50 mm curvature radius surface in contrast only leads to a static stress of approx. 37.5 MPa which is below the breakage stress for most 0.05 mm thick glasses. Providing a static stress of 37.5 MPa, however, is still a challenge for most OCA and lifetime could still be limited due to static fatigue of the glass.

Assuming the radius of a target curvature is R' and the curvature of the shaped ultrathin glass article in the at least one curved area is R with thickness t and Young's modulus E. The static stress $\sigma_{stat}$, when bending the shaped ultrathin glass article from the curvature R to the target curvature R' can be approximated as $$\sigma_{stat} = \left(1 - \frac{R}{R'}\right)\frac{tE}{2R}, \quad (R < R'), \tag{1}$$

$$\sigma_{stat} = \left(1 - \frac{R'}{R}\right)\frac{tE}{2R'}, \quad (R > R'). \tag{2}$$

For flat ultrathin glass, the bending radius R can be regarded as infinitely large, so the static stress could be approximated by $\sigma_{stat}$=tE/2R'. Compared with flat ultrathin glass, the static stress is largely reduced by providing the already low-precision i.e. close-to-final shaped ultrathin glass article with a curved area with curvature R. This yields two key benefits: Smaller curvature radii become possible since the static stress is lower than the glass breakage stress and longer fatigue lifetime due to the low static stresses.

For example, for a target curvature of 50 mm radius, a shaped 0.05 mm thick ultrathin glass article according to the invention with 50±5 mm low-precision curvature can be produced at extremely low cost (in contrast to the high-precision tolerance requirement of e.g. ±0.1 mm for thicker glasses). The static stress is significantly reduced and amounts to only about 10% compared with bending a flat glass to the target curvature, i.e. reducing the static stress from 37.5 MPa to 3.75 MPa. The external force for bringing the shaped ultrathin glass article into the target shape is thus small enough to be provided by e.g. an OCA by which the glass article is e.g. laminated to a curved surface with the target curvature. The static stress is moreover far below the breakage stress of the glass, in particular sufficiently low to ensure a viable lifetime of the laminated glass.

Based on the above insight, it is sufficient for ultrathin glass articles, i.e. glasses or glass sheets having thicknesses equal to or less than 0.4 mm, to provide the glass article with a low-precision close-to-final shape and to subsequently bend it into the high-precision target shape by an external force. Whereas the invention is advantageous for ultrathin glass articles with thicknesses equal to or less than 0.4 mm, the ultrathin glass article preferably has a thickness which is equal to or less than 0.2 mm, further preferably equal to or less than 0.1 mm, further preferably equal to or less than 0.05 mm, and further preferably equal to or less than 0.01 mm. Selected preferred thicknesses are 5 µm, 10 µm, 15 µm, 25 µm, 30 µm, 35 µm, 50 µm, 55 µm, 70 µm, 80 µm, 100 µm, 130 µm, 145 µm, 160 µm, 190 µm, 210 µm or 280 µm.

In a preferred embodiment, the at least one curved area extends over the whole ultrathin glass article. In other words, the whole shaped glass article has a curvature which can be constant, i.e. has the minimal curvature radius R, or can be non-uniform as e.g. a parabolic or hyperbolic curvature with minimal curvature radius R. The low-precision shaped ultrathin glass article according to the invention can therefore essentially also be applied in high-precision applications as e.g. lightweight parabolic mirrors. In other embodiments, the shaped ultrathin glass article can have several curved areas, with preferably alternating curvatures. The curvatures in the several curved areas can be different or the same, resulting in an irregular or regular corrugated shape, respectively.

Preferably, the minimal curvature radius R in the at least one curved area is equal or smaller than 5000 mm, preferably equal or smaller than 1000 mm, further preferably equal or smaller than 500 mm. At the same time, the minimal curvature radius R is preferably equal or larger than 1 mm, further preferably equal or larger than 3 mm, further preferably equal or larger than 10 mm, further preferably equal or larger than 30 mm, further preferably equal or larger than 50 mm. It is, however, to be understood that the shaped ultrathin glass article according to the invention can also be advantageously applied at essentially any minimal curvature radii that allows for non-breakage and sufficient fatigue lifetime.

The glass of the shaped glass article preferably comprises an alkali containing glass composition. Preferred glasses are e.g. lithium aluminosilicate glasses, soda-lime glasses, borosilicate glasses, alkali metal aluminosilicate glasses, and aluminosilicate glass with low alkali content. Such glasses can be produced by e.g. drawing as e.g. down-draw processes, overflow-fusion or float processes. These glasses are particularly suitable if an ion-exchange treatment shall be applied to the glass. In a preferred embodiment, the ultrathin glass article comprises a lithium aluminosilicate glass with the following composition in weight-%:

| Composition | weight-% |
| --- | --- |
| $SiO_2$ | 55-69 |
| $Al_2O_3$ | 18-25 |
| $Li_2O$ | 3-5 |
| $Na_2O + K_2O$ | 0-30 |
| $MgO + CaO + SrO + BaO$ | 0-5 |
| $ZnO$ | 0-4 |
| $TiO_2$ | 0-5 |
| $ZrO_2$ | 0-5 |
| $TiO_2 + ZrO_2 + SnO_2$ | 2-6 |
| $P_2O_5$ | 0-8 |
| F | 0-1 |
| $B_2O_3$ | 0-2 |

Preferably, the lithium aluminosilicate glass comprises the following glass composition in weight %:

| Composition | weight-% |
| --- | --- |
| $SiO_2$ | 57-66 |
| $Al_2O_3$ | 18-23 |
| $Li_2O$ | 3-5 |
| $Na_2O + K_2O$ | 3-25 |
| $MgO + CaO + SrO + BaO$ | 1-4 |
| $ZnO$ | 0-4 |
| $TiO_2$ | 0-4 |
| $ZrO_2$ | 0-5 |
| $TiO_2 + ZrO_2 + SnO_2$ | 2-6 |
| $P_2O_5$ | 0-7 |
| F | 0-1 |
| $B_2O_3$ | 0-2 |

Further preferably, the lithium aluminosilicate glass comprises the following glass composition in weight %:

| Composition | weight-% |
| --- | --- |
| $SiO_2$ | 57-63 |
| $Al_2O_3$ | 18-22 |
| $Li_2O$ | 3.5-5 |
| $Na_2O + K_2O$ | 5-20 |
| $MgO + CaO + SrO + BaO$ | 0-5 |
| $ZnO$ | 0-3 |
| $TiO_2$ | 0-3 |
| $ZrO_2$ | 0-5 |
| $TiO_2 + ZrO_2 + SnO_2$ | 2-5 |
| $P_2O_5$ | 0-5 |

| Composition | weight-% |
| --- | --- |
| F | 0-1 |
| $B_2O_3$ | 0-2 |

In another preferred embodiment, the ultrathin glass article comprises a soda-lime glass with the following composition in weight-%:

| Composition | weight-% |
| --- | --- |
| $SiO_2$ | 40-81 |
| $Al_2O_3$ | 0-6 |
| $B_2O_3$ | 0-5 |
| $Li_2O + Na_2O + K_2O$ | 5-30 |
| $MgO + CaO + SrO + BaO + ZnO$ | 5-30 |
| $TiO_2 + ZrO_2$ | 0-7 |
| $P_2O_5$ | 0-2 |

Preferably, the soda-lime glass comprises the following glass composition in weight-%:

| Composition | weight-% |
| --- | --- |
| $SiO_2$ | 50-81 |
| $Al_2O_3$ | 0-5 |
| $B_2O_3$ | 0-5 |
| $Li_2O + Na_2O + K_2O$ | 5-28 |
| $MgO + CaO + SrO + BaO + ZnO$ | 5-25 |
| $TiO_2 + ZrO_2$ | 0-6 |
| $P_2O_5$ | 0-2 |

Further preferably, the soda-lime glass comprises the following glass composition in weight %:

| Composition | weight-% |
| --- | --- |
| $SiO_2$ | 55-76 |
| $Al_2O_3$ | 0-5 |
| $B_2O_3$ | 0-5 |
| $Li_2O + Na_2O + K_2O$ | 5-25 |
| $MgO + CaO + SrO + BaO + ZnO$ | 5-20 |
| $TiO_2 + ZrO_2$ | 0-5 |
| $P_2O_5$ | 0-2 |

In another preferred embodiment, the ultrathin glass article comprises a borosilicate glass with the following composition in weight-%:

| Composition | weight-% |
| --- | --- |
| $SiO_2$ | 60-85 |
| $Al_2O_3$ | 0-10 |
| $B_2O_3$ | 5-20 |
| $Li_2O + Na_2O + K_2O$ | 2-16 |
| $MgO + CaO + SrO + BaO + ZnO$ | 0-15 |
| $TiO_2 + ZrO_2$ | 0-5 |
| $P_2O_5$ | 0-2 |

Preferably, the borosilicate glass comprises the following composition in weight-%:

| Composition | weight-% |
| --- | --- |
| $SiO_2$ | 63-84 |
| $Al_2O_3$ | 0-8 |
| $B_2O_3$ | 5-18 |
| $Li_2O + Na_2O + K_2O$ | 3-14 |
| $MgO + CaO + SrO + BaO + ZnO$ | 0-12 |
| $TiO_2 + ZrO_2$ | 0-4 |
| $P_2O_5$ | 0-2 |

Further preferably, the borosilicate glass comprises the following composition in weight-%:

| Composition | weight-% |
| --- | --- |
| $SiO_2$ | 63-83 |
| $Al_2O_3$ | 0-7 |
| $B_2O_3$ | 5-18 |
| $Li_2O + Na_2O + K_2O$ | 4-14 |
| $MgO + CaO + SrO + BaO + ZnO$ | 0-10 |
| $TiO_2 + ZrO_2$ | 0-3 |
| $P_2O_5$ | 0-2 |

In another preferred embodiment, the ultrathin glass article comprises an alkali metal aluminosilicate glass with the following composition in weight-%:

| Composition | weight-% |
| --- | --- |
| $SiO_2$ | 40-75 |
| $Al_2O_3$ | 10-30 |
| $B_2O_3$ | 0-20 |
| $Li_2O + Na_2O + K_2O$ | 4-30 |
| $MgO + CaO + SrO + BaO + ZnO$ | 0-15 |
| $TiO_2 + ZrO_2$ | 0-15 |
| $P_2O_5$ | 0-10 |

Preferably, the alkali metal aluminosilicate glass comprises the following composition in weight-%:

| Composition | weight-% |
| --- | --- |
| $SiO_2$ | 50-70 |
| $Al_2O_3$ | 10-27 |
| $B_2O_3$ | 0-18 |
| $Li_2O + Na_2O + K_2O$ | 5-28 |
| $MgO + CaO + SrO + BaO + ZnO$ | 0-13 |
| $TiO_2 + ZrO_2$ | 0-13 |
| $P_2O_5$ | 0-9 |

Further preferably, the alkali metal aluminosilicate glass comprises the following composition in weight-%:

| Composition | weight-% |
| --- | --- |
| $SiO_2$ | 55-68 |
| $Al_2O_3$ | 10-27 |
| $B_2O_3$ | 0-15 |
| $Li_2O + Na_2O + K_2O$ | 4-27 |
| $MgO + CaO + SrO + BaO + ZnO$ | 0-12 |
| $TiO_2 + ZrO_2$ | 0-10 |
| $P_2O_5$ | 0-8 |

In another preferred embodiment, the ultrathin glass article comprises an aluminosilicate glass with low alkali content with the following composition in weight-%:

| Composition | weight-% |
| --- | --- |
| $SiO_2$ | 50-75 |
| $Al_2O_3$ | 7-25 |
| $B_2O_3$ | 0-20 |
| $Li_2O + Na_2O + K_2O$ | 0-4 |
| $MgO + CaO + SrO + BaO + ZnO$ | 5-25 |
| $TiO_2 + ZrO_2$ | 0-10 |
| $P_2O_5$ | 0-5 |

Preferably, the aluminosilicate glass with low alkali content comprises the following composition in weight-%:

| Composition | weight-% |
| --- | --- |
| $SiO_2$ | 52-73 |
| $Al_2O_3$ | 7-23 |
| $B_2O_3$ | 0-18 |
| $Li_2O + Na_2O + K_2O$ | 0-4 |
| $MgO + CaO + SrO + BaO + ZnO$ | 5-23 |
| $TiO_2 + ZrO_2$ | 0-10 |
| $P_2O_5$ | 0-5 |

Further preferably, the aluminosilicate glass with low alkali content comprises the following composition in weight-%:

| Composition | weight-% |
| --- | --- |
| $SiO_2$ | 53-71 |
| $Al_2O_3$ | 7-22 |
| $B_2O_3$ | 0-18 |
| $Li_2O + Na_2O + K_2O$ | 0-4 |
| $MgO + CaO + SrO + BaO + ZnO$ | 5-22 |
| $TiO_2 + ZrO_2$ | 0-8 |
| $P_2O_5$ | 0-5 |

The glasses used in the invention, in particular the above mentioned glasses, can also be modified. For example, the color can be modified by adding transition metal ions, rare earth ions as e.g. $Nd_2O_3$, $Fe_2O_3$, $CoO$, $NiO$, $V_2O_5$, $MnO_2$, $TiO_2$, $CuO$, $CeO_2$, $Cr_2O_3$. Inclusion of such modifying colorant can e.g. enrich the design of consumer electronics such as color requirements for back covers or can provide an additional function for the ultrathin glass article as e.g. as color filters. In addition, luminescence ions, such as transition metals and rare earth ions can be added in order to endow optical functions, such as optical amplifiers, LEDs, chip lasers etc. In particular, 0-5 weight-% of rare earth oxides can be added to introduce magnetic, photon or optical functions. Moreover, refining agents as e.g. $As_2O_3$, $Sb_2O_3$, $SnO_2$, $SO_3$, Cl, F, and/or $CeO_2$ can be added into the glass compositions in amounts of 0-2 weight-%.

The glass article can also be provided with an anti-microbial function by applying an ion-exchange of the glass article in an $Ag^+$-containing salt bath or a $Cu^{2+}$-containing salt bath. After the ion-exchange the concentration of $Ag^+$ or $Cu^{2+}$ is higher than 1 ppm, preferably higher than 100 ppm, and more preferably higher than 1000 ppm. The ultrathin glass with anti-microbial function could be applied for medical equipment such as computer or screen used in hospitals and consumer electronics with anti-microbial function.

It is to be understood that the sum of the components of the glass composition amounts to 100 weight-%. Further preferred variations of such glasses can be found in e.g. WO2014139147 and are hereby incorporated by reference.

The at least one curved area preferably is a result of a non-precision forming process as thermal bending, thermal slumping and/or thermal molding. As mentioned in the above, high-precision forming processes are generally expensive and therefore not suitable for mass production. The low-precision shaped ultrathin glass article according to the invention in contrast can be formed by low-precision forming methods that are cheap and easy to achieve. The molds for thermal slumping or bending can e.g. be made of graphite and the surface can be mechanically polished without special coating in contrast to the requirements of high-precision molds which are usually made of expensive tungsten carbide and need additional coatings that degenerate during production and need to be refurbished.

Another low-precision forming process which can advantageously be applied in addition to other forming processes or alone is unbalanced surface compressive stressing. By this process, the at least one curved area is a result of the unbalanced surface compressive stressing, where a surface compressive stress and/or a depth of layer in the at least one curved area on one of the two surfaces of the ultrathin glass article is larger than the surface compressive stress and/or the depth of layer on the other surface, resulting in surface compressive stresses and/or depths of layers on the both surfaces that are unbalanced with respect to a central tensile stress of the ultrathin glass article. Surface compressive stress hereby refers to an integrated surface compressive stress, inherent to the glass article. Due to the unbalanced surface compressive stresses and/or depths of layers with respect to the central tensile stress, the flat ultrathin glass article experiences an internal bending force. Due to the ultrathin thickness, this bending force is large enough to deflect the ultrathin glass article in to a relaxed curved shape. The unbalanced surface compressive stresses can e.g. be measured if the shaped ultrathin glass article is brought into a flat shape.

The maximum of the larger of the surface compressive stresses preferably lies in the range from 10 MPa to 1200 MPa, where the smaller surface compressive stress preferably amounts to at most 90% of the larger surface compressive stress, further preferably at most 50%, further preferably at most 30%, where preferably the smaller surface compressive stress vanishes. The particular choices of the difference in the surface compressive stresses and/or depths of layers depend on the particulars of a given requirement as e.g. thickness of the glass article and required curvature radius. The unbalanced surface compressive stressing and a shaped ultrathin glass article with unbalanced compressive surface stresses by itself form inventive aspects and as such are regarded as an invention independent of the further features described herein. The surface compressive stressing thereby comprises establishing the unbalanced surface compressive stresses and/or depths of layers in which the surface compressive stresses are established.

The unbalanced surface stresses and/or depths of layers can be easily achieved at low-cost. Preferably, the unbalanced surface compressive stresses and/or depths of layers in the at least one curved area are a result of unbalanced annealing of the surfaces of the ultrathin glass article and/or unequal ion-exchanging surface layers on the surfaces of the ultrathin glass article such that the ultrathin glass article has unbalanced annealed surfaces and/or unequal ion-exchanged surface layers.

Unbalanced annealing of the two surfaces in the curved area results in different surface stresses and/or depths of layers. The unbalanced annealing can be achieved as an in-line process e.g. during manufacture of the ultrathin glass by e.g. unbalanced cooling of the surfaces in a down-draw process. Alternatively, the unbalanced annealing can be applied off-line, as a post-process, after production of a semi-finished ultrathin glass sheet that is later shaped into the shaped ultrathin glass article of the invention.

Another preferred method for achieving the unbalanced surface stresses and/or depths of layers is non-uniform or unequal ion-exchange on the both surfaces in the curved area of the ultrathin glass article. Uniform ion-exchange on the surfaces of glass sheets is well-known for strengthening a glass article. Unbalanced ion-exchange for shaping a flat glass article, in contrast, is a novel process for shaping an ultrathin glass article and as such forms an independent aspect of the invention. Similar, a shaped ultrathin glass article having unequal ion-exchanged surface layers on its both surfaces forms an independent invention. The unbalanced ion-exchange results in unequal ion-exchanged surface layers on the both surfaces of the glass article with unequal associated surface compressive stresses and/or unequal depths of layers. By adjusting the ion-exchange parameters as e.g. the depth of layers DoL and/or the surface compressive stresses CS, the curvature in the curved area can be controlled. DoL and CS can be a function of a surface coordinate x such that a variable profile and thereby a variable curvature can be achieved. The method thus advantageously provides for an easy and cost effective process for shaping an ultrathin glass article at low-precision resulting in a cheap and easy to produce shaped ultrathin glass article. It is, however, to be understood that this method can also be advantageously applied as a high-precision shaping methods if the particular application so requires.

Preferably, the ion-exchanged surface layer on the surface with the larger surface compressive stress has a depth of layer (DoL) in the range from 1 µm to 50 µm, preferably in the range from 1 µm to 30 µm further preferably in the range from 1 µm to 10 µm further preferably 1 µm to 3 µm. The specifically preferred parameters generally depend on the required parameters of the ultrathin glass article.

In preferred embodiments, the product of the difference of the surface compressive stresses in the curved area ΔCS and the difference in the depth of layers ΔDoL of the ion-exchanged surface layer on the surface with the larger compressive stress is in the range from 2 MPa·µm to 30'000 MPa·µm, preferably 5 MPa·µm to 10'000 MPa·µm, further preferably 50 MPa·µm to 2'500 MPa·µm.

The following Table 1 gives some preferred combinations of ranges of DoL and CS of the surface with the larger surface compressive stress and ΔCS·ΔDoL for several exemplary thicknesses of the ultrathin glass article:

TABLE 1

Ranges of DoL(x) and CS(x) for several exemplary thicknesses

| Thickness [mm] | DoL(x) [µm] | CS(x) [Mpa] | ΔCS · ΔDoL [MPa · µm] |
|---|---|---|---|
| 0.3 | 0 < DoL < 50 | 0 < CS < 1200 | 1'688 < ΔCS · ΔDoL < 30'000 |
| 0.2 | 0 < DoL < 50 | 0 < CS < 1200 | 750 < ΔCS · ΔDoL < 30'000 |
| 0.1 | 0 < DoL < 30 | 0 < CS < 1200 | 188 < ΔCS · ΔDoL < 18'000 |
| 0.07 | 0 < DoL < 25 | 0 < CS < 1200 | 92 < ΔCS · ΔDoL < 15'000 |
| 0.05 | 0 < DoL < 20 | 0 < CS < 1200 | 474 < ΔCS · ΔDoL < 12'000 |
| 0.025 | 0 < DoL < 10 | 0 < CS < 1200 | 124 < ΔCS · ΔDoL < 6'000 |
| 0.01 | 0 < DoL < 3 | 0 < CS < 1200 | 42 < ΔCS · ΔDoL < 1'800 |

The values in Table 1 are derived from the equation $$\Delta\sigma = \frac{\int \Delta CS \cdot \Delta DoL \, dxdydz}{\frac{t}{2}},$$

where $\Delta\sigma$ is the internal tensile or compressive stress of the unbalanced ion-exchanged ultrathin glass after relaxation into the bent shape.

$$\int \Delta CS \cdot \Delta DoL \, dxdydz = \frac{DoL}{2} \cdot \Delta\sigma,$$

$\Delta\sigma$, if DoL is the same on both sides. The minimum $\Delta CS \cdot \Delta DoL$ is calculated based on 1000 mm radius at the different thicknesses, and the maximum is calculated based on $(DoL_{max} \cdot CS_{max})/2$. It is to be noted that the values in Table 1 are exemplary and based on the simplified assumptions of constant $CS(x)$ and $DoL(x)$ on the respective surfaces.

In a preferred embodiment, the shaped ultrathin glass article is bendable out-of-shape to a target minimal curvature radius $R' \neq R$ in the curved area without breakage, resulting in a non-vanishing static surface tensile stress in the curved area, wherein preferably the resulting static surface tensile stress is not greater than $$1.15 \cdot \text{Min}\left(\overline{\sigma}_a - \Delta_a 0.4 \cdot \left(1 - \ln\left(\frac{A_{ref}}{A_{App}}\Phi\right)\right), \overline{\sigma}_e - \Delta_e 0.4 \cdot \left(1 - \ln\left(\frac{L_{ref}}{L_{App}}\Phi\right)\right)\right), \quad (3)$$

where $l_{ref}$ is the stressed edge length and $A_{ref}$ is the stressed surface area of the side faces of ultrathin glass samples, $\overline{\sigma}_a$ being the median of the tensile stress of samples of the ultrathin glass upon break of the samples, where the break occurs within a side face of the samples within the stressed surface area, and $\overline{\sigma}_e$ is the median of the tensile stress of samples of the ultrathin glass upon break of the samples, where the break emanates from an edge of the samples within the stressed edge length, $\Delta_e$ and $\Delta_a$ being standard deviations of the tensile stress upon break of the samples at the edge or within a side face of the samples, respectively (i.e. the standard deviations of the median values $\overline{\sigma}_e$, $\overline{\sigma}_a$), $A_{app}$ being the surface area of one side face of the ultrathin glass article and $L_{app}$ being the cumulated edge length of the longitudinal edges of the ultrathin glass article, and $\Phi$ being a specified maximum rate of breakage within a time interval of at least half a year.

Often, a longer lifetime than half a year will be needed. To guarantee a low rate of breakage for longer terms such as, e.g., ten years, it is preferred that the resulting static tensile stress is not greater than $$0.93 \cdot \text{Min}\left(\overline{\sigma}_a - \Delta_a 0.4 \cdot \left(1 - \ln\left(\frac{A_{ref}}{A_{App}}\Phi\right)\right), \overline{\sigma}_e - \Delta_e 0.4 \cdot \left(1 - \ln\left(\frac{L_{ref}}{L_{App}}\Phi\right)\right)\right). \quad (4)$$

Preferably, the maximum rate of breakage $\Phi$ is less than 0.1, further preferably less than 0.05.

As an example, a pre-bended ultra-thin glass article having a glass thickness of 0.05 mm, a Young's modulus of 74.8 GPa and a minimal curvature radius R of 77 mm may be regarded. The target curvature radius R' is set to be 75 mm. The maximum rate of breakage $\Phi$ is set to 0.1.

For this sample, break tests were performed with samples having a surface area $A_{Ref} = 121$ mm². The relevant edge length for the two-point bending test employed in this example amounts to $L_{Ref} = 2$ mm. The break tests yielded $\overline{\sigma}_a = 421$ MPa (median) and $\Delta_a = 35$ MPa (standard deviation) as parameters for the surface strength; $\overline{\sigma}_e = 171$ MPa (median) and $\Delta_e = 16.9$ MPa (standard deviation) as parameters for the edge strength. Using $A_{app} = 0.06$ m×0.1 m=6·10⁻³ m² and $L_{app} 2 \times 0.1$ m=2·10⁻¹ m in Term (4) yields:

$$\overline{\sigma}_a - \Delta_a 0.4 \times \left(1 - \ln\left(\frac{A_{ref}}{A_{app}}\Phi\right)\right) = \quad (5)$$

$$\left(421 - 35 \times 0.4 \times \left(1 - \ln\left(\frac{121 \times 10^{-6} \text{m}^2}{6 \times 10^{-3} \text{m}^2} \times 0.1\right)\right)\right) \text{MPa} \approx 398 \text{ MPa}$$

$$\overline{\sigma}_e - \Delta_e 0.4 \times \left(1 - \ln\left(\frac{L_{ref}}{L_{app}}\Phi\right)\right) = \quad (6)$$

$$\left(171 - 16.9 \times 0.4 \times \left(1 - \ln\left(\frac{2 \times 10^{-3} \text{m}}{2 \times 10^{-1} \text{m}} \times 0.1\right)\right)\right) \text{MPa} \approx 118 \text{ MPa}$$

$$0.93 \times \text{Min}(398 \text{ MPa}, 118 \text{ MPa}) \approx 110 \text{ MPa} \quad (7)$$

The resulting static stress $\sigma_{stat}$ can be calculated according to equations (1) and (2) above. That is, for the example set forth in the preceding paragraph, the resulting static stress $\sigma_{stat}$ is approximately 0.65 MPa (using eq. 2). The resulting static stress is therefore much lower than the maximum tolerable stress according to equations (5) and (6).

As is evident from the example, the resulting static tensile stress for the laminated shaped ultrathin glass article is much lower than for a flat glass-article that is bent into the target shape. Moreover, the resulting static tensile stress is even lower than 7 MPa, the value set for long-term reliability of the glass sample.

In a preferred embodiment, the shaped ultrathin glass article is laminated onto a target surface, in particular laminated out-of-shape onto the target surface having a target curvature radius $R' \neq R$ in the curved area.

The invention also concerns a device having a lamination surface with a curved area with a minimal lamination curvature radius R', which has a shaped ultrathin glass article as described herein laminated to the lamination surface. Preferably, the target lamination curvature radius R' is not equal to the minimal curvature radius R of the at least one curved area of the shaped ultrathin glass article. The lamination can thereby e.g. be achieved by an Optical Clear Adhesive (OCA) as they are commonly used in the art and the device can e.g. be a cellular telephone or a tablet computer or any other application where the shaped ultrathin glass article according to the invention can be advantageously applied.

In a preferred embodiment, the deviation of the target curvature radius R' from the minimal curvature radius R can be up to 50%, preferably up to 25%, further preferably up to 20%, further preferably up to 10%. Generally, the deviation is equal to or larger than 1%, dependent on the tolerance of the low-precision production process used for the production of the ultrathin glass article. It is to be understood that the shaped glass article according to the invention can of course also be applied if the deviation is smaller than 1% or even smaller than 0.1%. The advantage of the invention, however, lies in the fact that it is not necessary to have such a high-precision shape of the glass article in order to apply it at a desired high-precision curvature. Preferably, the ratio of the resulting static surface tensile stress in the at least one curved area and an average breakage stress of the ultrathin glass article is equal or lower than 20%, preferably equal or lower than 10%, further preferably equal or lower than 5%, further preferably equal or lower than 1%. If the resulting static tensile stress does not exceed these values, a very long-term reliability, even a life-time reliability of the ultrathin glass article can be assumed. In other words, no failure due to glass breakage will occur during the intended use of the device.

The resulting static surface tensile stress in the at least one curved area is thereby preferably less than 75 MPa, preferably equal or less than 20 MPa, further preferably equal or less than 10 MPa, further preferably equal or less than 3 MPa, further preferably equal or less than 1 MPa. These values, however, strongly depend on the average breakage strength of the glasses in use. Some glasses as e.g. glass C in Table 2 below with a thickness of 0.1 mm have very high average breakage strength of 717 MPa after chemical strengthening and as such can have a comparatively high surface resulting tensile stress when bent out-of-shape without significant decrease in fatigue lifetime. Other glasses as e.g. glass B or C in Table 2 have average breakage strengths between 150 MPa and 200 MPa without strengthening.

The invention further concerns a method for producing a shaped glass article and in particular a shaped ultrathin glass article according to the invention as described herein. The method comprises: providing an ultrathin glass with two surfaces and one or more edges joining the two surfaces, having a thickness between the two surfaces; shaping the ultrathin glass to a shaped ultrathin glass article by forming at least one curved area having a non-vanishing surface curvature with a minimal curvature radius R if no external forces are applied to the shaped ultrathin glass article; where the forming of the at least one curved area preferably includes forming an essentially one-dimensional curvature with preferably essentially constant curvature in one surface direction.

In a preferred embodiment, the shaping of the ultrathin glass comprises applying a non-precision forming process, including but not restricted to thermal bending, thermal slumping, thermal molding, and/or unbalanced surface stressing to the ultrathin glass in an at least one area to be curved. The unbalanced surface stressing thereby refers to a process resulting in surface compressive stressed layers on the both surfaces that are unbalanced with respect to an interlayer of the glass where the counteracting central tensile stress of the ultrathin glass article is generated. Preferably, the unbalanced surface stressing comprises unbalanced annealing of the surfaces of the ultrathin glass and/or unequal ion-exchange on the surfaces of the ultrathin glass.

The unequal ion-exchange preferably comprises applying alkaline metal salts to the ultrathin glass, preferably one or more of the following alkaline metal salts: $NaNO_3$, $Na_2CO_3$, $NaOH$, $Na_2SO_4$, $NaF$, $Na_3PO_4$, $Na_2SiO_3$, $Na_2Cr_2O_7$, $NaCl$, $NaBF_4$, $Na_2HPO_4$, $K_2CO_3$, $KOH$, $KNO_3$, $K_2SO_4$, $KF$, $K_3PO_4$, $K_2SiO_3$, $K_2Cr_2O_7$, $KCl$, $KBF_4$, $K_2HPO_4$, $CsNO_3$, $CsSO_4$, $CsCl$. The unequal ion-exchange preferably comprises fully or partially submerging the ultrathin glass in an alkaline metal salt bath for 15 minutes to 48 hours, preferably at a temperature between 350° C. and 700° C. The unequal ion-exchange can advantageously comprise applying a paste containing alkaline metal salts to one or both of the surfaces in the curved area and annealing the ultrathin glass sheet, where preferably the paste is dried at a temperature of 100° C. and 300° C. for 2 to 10 hours prior to annealing. The ion-exchange can then be driven by heating the ultrathin glass to a temperature in the range from 200° C. to 765° C. for 15 minutes to up to 48 hours.

In a preferred embodiment, the unequal ion-exchange includes controlling a slow ion-exchange rate to achieve an ion-exchange surface layer with a depth of layer of equal to or less than 50 μm, preferably equal to or less than 30 μm, further preferably equal to or less than 10 μm, further preferably equal to or less than 3 μm, and preferably a maximum surface compressive stress in the range from 10 MPa to 1200 MPa. If the unbalanced ion-exchange includes having no ion-exchange on one of the surfaces, DoL and CS on this surface can vanish.

The unbalanced ion-exchange is preferentially achieved by controlling a slow ion-exchange rate during the ion-exchange to achieve the depths of ion-exchanged layer DoL as mentioned, the surface compressive stresses CS as mentioned and a central tensile stress CT ($\sigma_{CT}$) of equal or less than 120 MPa, wherein the thickness t, DoL, CS and CT of the toughened ultrathin glass article meet the relationship $$\frac{0.2t}{L_{DoL}} \le \frac{\sigma_{CS}}{\sigma_{CT}}.$$

In a preferred embodiment of the method, the unbalanced surface stressing comprises masking at least one of the surfaces in the at least one area to be curved, preferably by applying a cover or coating, which fully or partially prevents surface stressing. Preferably, the masking is removed after the surface stressing. The masking can be designed to completely prevent or partially inhibit the surface stressing in the at least one masked area. In case of ion-exchange, a suitable method for preventing the ion-exchange is masking by coating an Indium Tin Oxide film (ITO-film) to the ultrathin glass. A $SiO_{02}$ coating can slow down the ion-exchange rate. In a preferred embodiment, one whole surface of the ultrathin glass is masked whereas the other surface has no masking, resulting in one curved area extending over the whole ultrathin glass article.

In a preferred embodiment, the method includes re-shaping the shaped glass article by laminating the shaped ultrathin glass article out-of-shape onto a lamination surface with a target curvature radius R'≠R in the curved area, in particular the lamination surface of a device, so that the resulting static tensile stress is not greater than $$1.15 \cdot \text{Min}\left(\overline{\sigma}_a - \Delta_a 0.4 \cdot \left(1 - \ln\left(\frac{A_{ref}}{A_{App}}\Phi\right)\right), \overline{\sigma}_e - \Delta_e 0.4 \cdot \left(1 - \ln\left(\frac{L_{ref}}{L_{App}}\Phi\right)\right)\right), \quad (3)$$

preferably not greater than $$0.93 \cdot \text{Min}\left(\overline{\sigma}_a - \Delta_a 0.4 \cdot \left(1 - \ln\left(\frac{A_{ref}}{A_{App}}\Phi\right)\right), \overline{\sigma}_e - \Delta_e 0.4 \cdot \left(1 - \ln\left(\frac{L_{ref}}{L_{App}}\Phi\right)\right)\right), \quad (4)$$

where $L_{ref}$ is the stressed edge length and $A_{ref}$ is the stressed surface area of the side faces of ultra-thin glass samples, $\overline{\sigma}_a$ being the median of the tensile stress of samples of the ultrathin glass upon break of the samples, where the break occurs within a side face of the samples within the stressed surface area, and $\overline{\sigma}_e$ is the median of the tensile stress of samples of the ultrathin glass upon break of the samples, where the break emanates from an edge of the samples within the stressed edge length, $\Delta_e$ and $\Delta_a$ being standard deviations of the tensile stress upon break of the samples at the edge or within a side face of the samples, respectively (i.e. the standard deviations of the median values $\overline{\sigma}_e$, $\overline{\sigma}_a$), $\Delta_{app}$ being the surface area of one side face of the ultrathin glass and $L_{app}$ being the cumulated edge length of the longitudinal edges of the ultrathin glass, and $\Phi$ being a specified maximum rate of breakage within a time interval of at least half a year. The maximum rate of breakage $\Phi$ is preferably less than 0.1, further preferably less than 0.05.

The invention further concerns the use of a shaped ultrathin glass article according to the invention or a shaped ultrathin glass article as produced by the method according to the invention, as display, display cover, in particular for OLED display, OLED lightning, sensors, in particular touch or fingerprint sensors, thin film batteries, PCB/CCL, capacitors, E-papers or MEMS/MOEMS. Further preferred uses include semiconductor packaging, protective member for shaped or curved windows as well as shaped decorative elements. The invention also concerns the use of a low-precision shaped ultrathin glass article with a curvature radius tolerance of up to 50%, preferably up to 25%, in high-precision applications with curvature radius tolerances of less than 1%, preferably less than 0.1%.

BRIEF DESCRIPTION OF THE DRAWINGS

The exemplary figures used for illustration of the invention show schematically:

FIG. 5b is the shaped ultrathin glass article according to the invention resulting from the ion-exchanged surface layers according to FIG. 5a;

The dimensions and aspect ratios in the figures are not to scale and have been oversized in places for better visualization. Corresponding elements in the figures are generally referred to by the same reference numerals.

DETAILED DESCRIPTION

Figure 1:
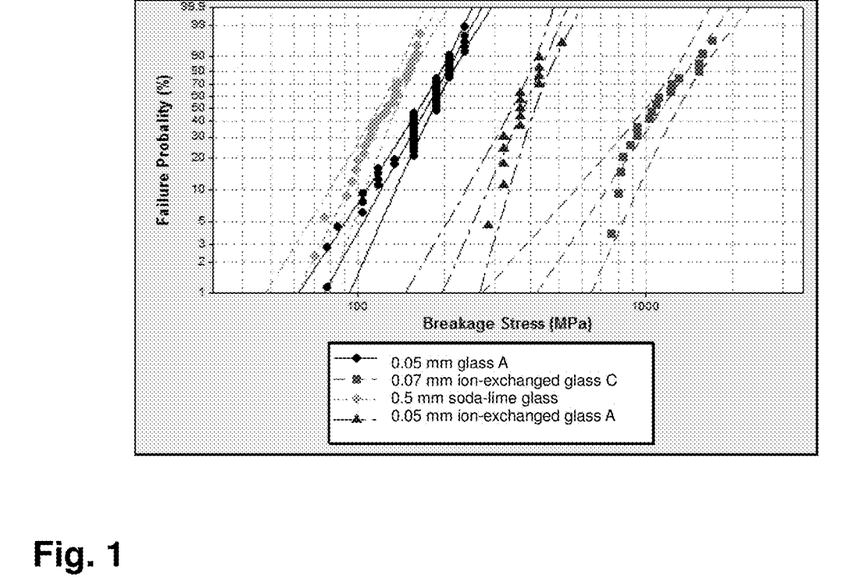
FIG. 1 is a Weibull diagram for a soda-lime glass as well as glasses A and C according to Table 2 at different thicknesses and different stressing status.

FIG. 1 shows a double logarithmic plot for the cumulative probability in % of the breakage strengths of different glass types at different thicknesses and stressing status (Weibull diagram). The breakage strength of 0.5 mm soda-lime glass indicates the breakage strength of a comparison sample representing a typical inorganic glass of similar thickness. The plot for 0.05 mm glass A (see Table 2 below) without ion-exchange represents the typical strength of inorganic glass thinner than 0.1 mm. The plot for 0.05 mm toughened glass A (Table 2) with ion-exchange shows the strength that can be achieved by unbalanced ion-exchanging glass A in a K-ion salt bath. The plot for 0.07 mm glass C (Table 2) shows the achievable strength after ion-exchange of an aluminosilicate glass in a K-ion salt bath.

Figure 2:
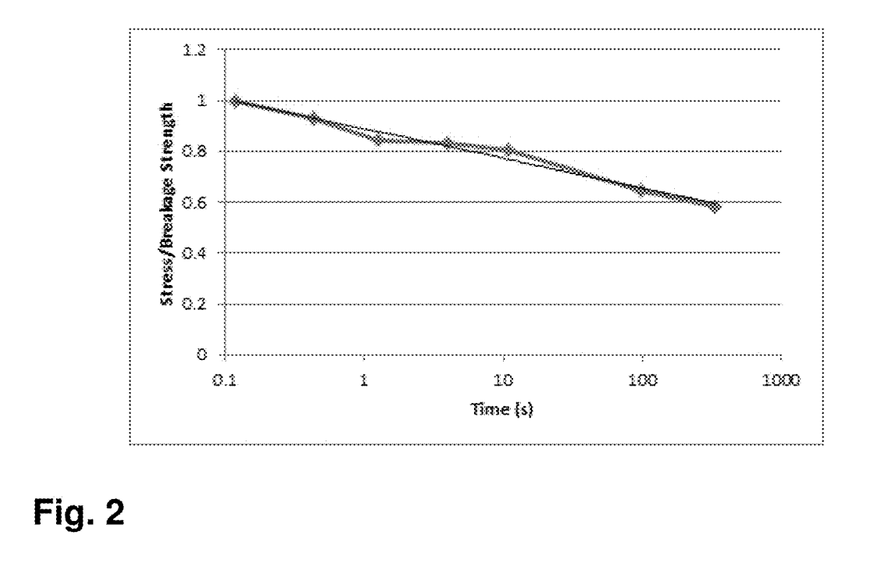
FIG. 2 is a log-linear plot of fatigue lifetime vs. ratio of static stress and breakage stress for glass samples of glass A with a thickness of 0.07 mm.

FIG. 2 shows a log-linear plot of the fatigue lifetime of ultrathin glass samples made from glass A (Table 2) at a thickness of 0.07 mm. On the one hand, the plot shows that the logarithm of the fatigue lifetime (in seconds) is linear to the ratio between static stress and breakage stress of the glass. The plot can be used for extrapolation of the fatigue lifetime. A reduction of the static stress to ¹/₁₀ of the original stress can increase the fatigue lifetime of the glass sheet about 1,000 times. On the other hand, the force needed to deform the glass sample to a certain deflection is proportional to the cube of the glass thickness. Hence, ultrathin glasses can be bent at significantly lower forces as compared to thicker glasses, i.e. at lower static stresses if e.g. laminated to a target surface, with fatigue lifetimes that still exceed the usual lifetime of the corresponding application.

Figure 3:
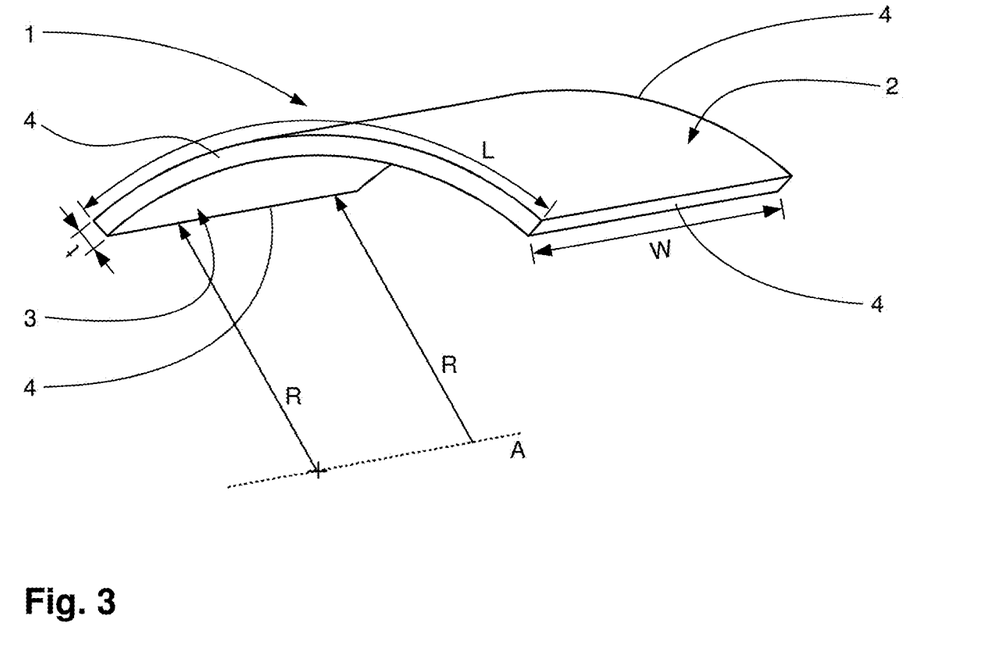
FIG. 3 is a shaped ultrathin glass sheet according to the invention.

FIG. 3 shows a shaped ultrathin glass article 1 (hereinafter referred to "glass article 1") according to the invention as it can be obtained from a rectangular flat glass sheet with a length L, a width W and a thickness t. The glass article 1 can also have other shapes as e.g. a circular shape or any other shape as required by the desired application.

The glass article 1 has a first surface 2 and an opposing second surface 3 which are joined by four edges 4. The glass article 1 has a one-dimensional curvature with an essentially constant radius R in a direction perpendicular to an axis A and no curvature along A. The shape of the glass article 1 therefore corresponds to a section of the mantle surface of a virtual regular circular cylinder with cylinder axis A and thus, in the terminology used herein, has one curved area extending over the whole glass article 1. According to the invention, the curvature of the glass article 1 can be achieved by a non-precision-forming process such as thermal bending, thermal slumping, thermal molding and/or unbalanced surface compressive stressing, the latter including unbalanced annealing and/or unbalanced ion-exchanging on the two surfaces.

FIGS. 4a to 4d show partial sectional views of exemplary embodiments of the glass article 1 in a flattened state with ion-exchanged surface layers. The figures exemplarily depict the depth of layer DoL for the different embodiments. The diagrams above and/or below the surfaces 2 and 3 show the qualitative profile of associated surface compressive stresses CS along a surface coordinate x. It is to be understood that the corresponding profiles of CS and DoL can also derive from an annealing treatment and the basic principle is not limited to ion-exchanged surface layers. Furthermore, the present surface layers are to be understood to vary only in the surface direction x whereas they are constant in a perpendicular surface direction (one-dimensional variation).

Figure 4A:
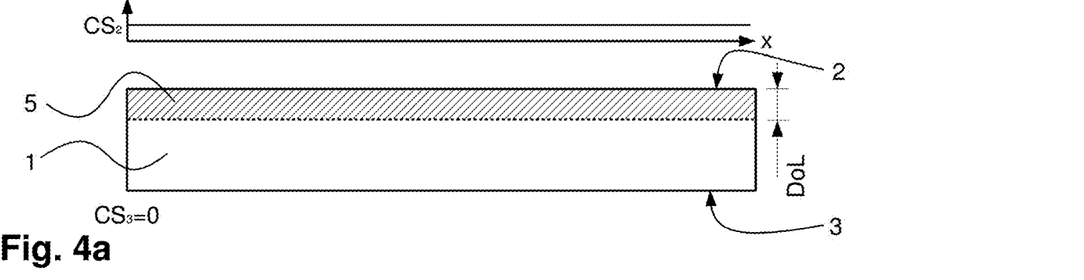
FIG. 4a-4d are several different embodiments of an ultrathin glass article with unbalanced ion-exchanged surface layers in a flat configuration.

FIG. 4a shows an embodiment of the glass article 1 having an ion-exchanged surface layer 5 with a constant DoL on the surface 2 whereas the surface 3 has no ion-exchanged layer. This configuration results in a constant surface compressive stress $CS_2$ on surface 2 and a surface compressive stress $CS_3=0$ on surface 3. The glass article 1 results in a shaped glass article 1 as shown in FIG. 3 due to the unbalanced surface compressive stresses $CS_2$ and $CS_3$, where the surface 2 is the convex surface.

Figure 4B:
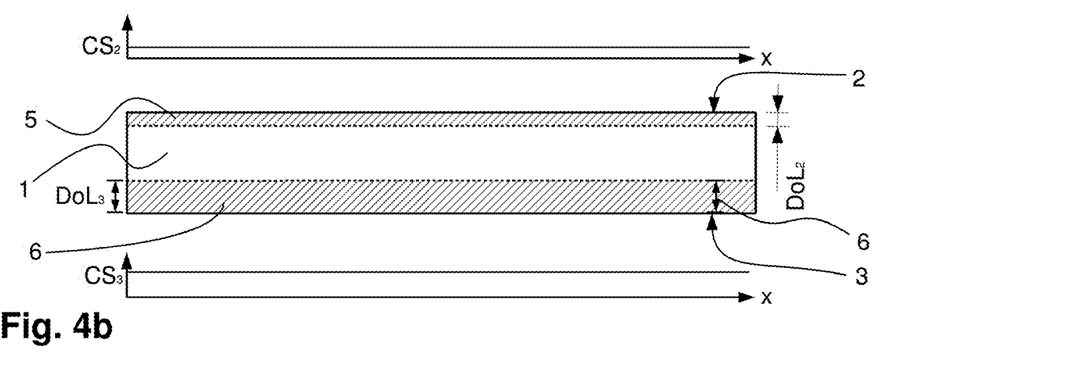

FIG. 4b shows an embodiment of the glass article 1 having a surface layer 5 with a constant $DoL_2$ on surface 2 and a surface layer 6 with a constant $DoL_3$ on surface 3, where $DoL_2<DoL_3\neq0$. As a result, the surface compressive stresses $CS_2$ and $CS_3$ are also different and non-vanishing. Dependent on the difference $\Delta CS=|CS_2-CS_3|$, the glass article 1 receives a curved shape, where in this case, the surface 3 becomes the convex surface.

Figure 4C:
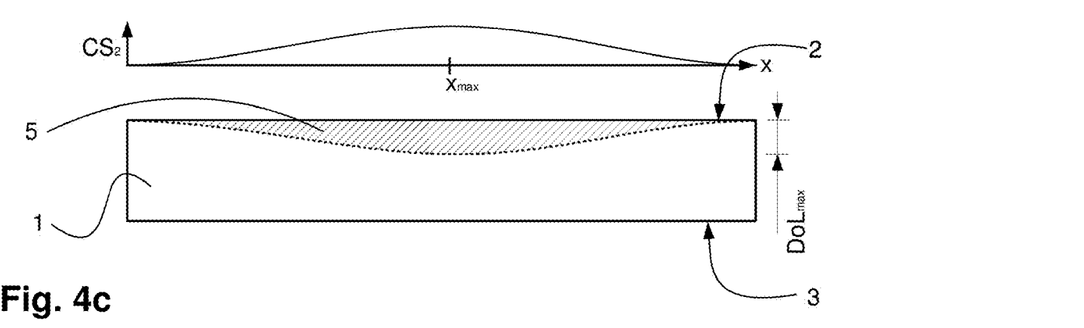

FIG. 4c shows an embodiment of the glass article 1 with a surface layer 5 on surface 2 with a variable depth, i.e. $DoL=DoL(x)$, whereas the surface 3 has no ion-exchanged surface layer. $DoL(x)$ has a maximum $DoL_{max}$ at a location $x_{max}$ in the center of the glass article 1. As a result, the surface compressive stress $CS_2$ is also a function of coordinate x with a maximum at $x_{max}$. The glass article 1 in this case receives a variable curvature $R=R(x)$ with a minimum curvature radius $R_{min}$ at $x_{max}$, where the curvature radius $R(x)$ increases with increasing distance from $x_{max}$. Dependent on the function of $DoL(x)$ or $CS(x)$, the resulting shape of the glass article can be e.g. cylindrical parabolic or hyperbolic.

Figure 4D:
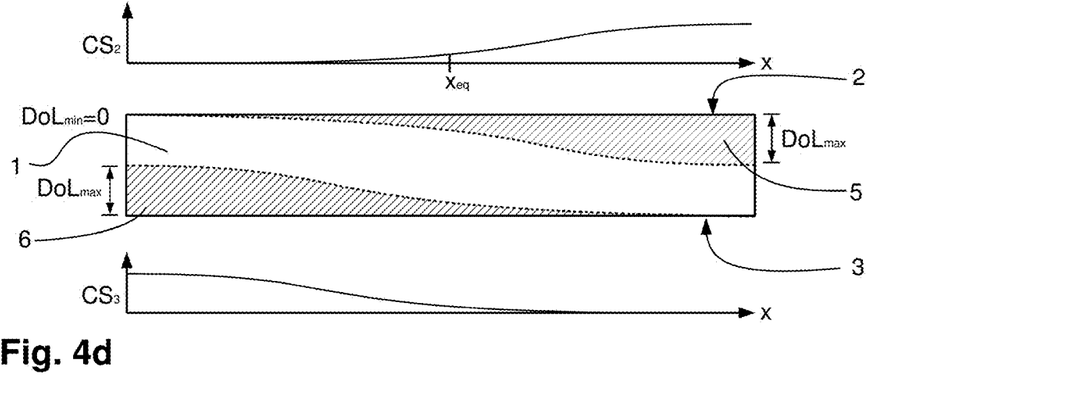

FIG. 4d shows another embodiment of the glass article 1 with a surface layer 5 on surface 2 with a variable depth, i.e. $DoL_2=DoL_2(x)$, whereas the surface 3 has a surface layer 6 with a corresponding but in x-direction inverted profile for $DoL_3(x)$. $DoL_2(x)$ has a minimum at the smallest x and a maximum at the largest x. In this case, the curvature radius $R=R(x)$ is largest at the edges of the glass article 1 whereas there is no curvature at $x_{eq}$ where $DoL_2(x_{eq})=DoL_3(x_{eq})$. The glass article 1 according to FIG. 4d therefore has two curved regions with alternating curvature, separated at $x_{eq}$.

Figure 5A:
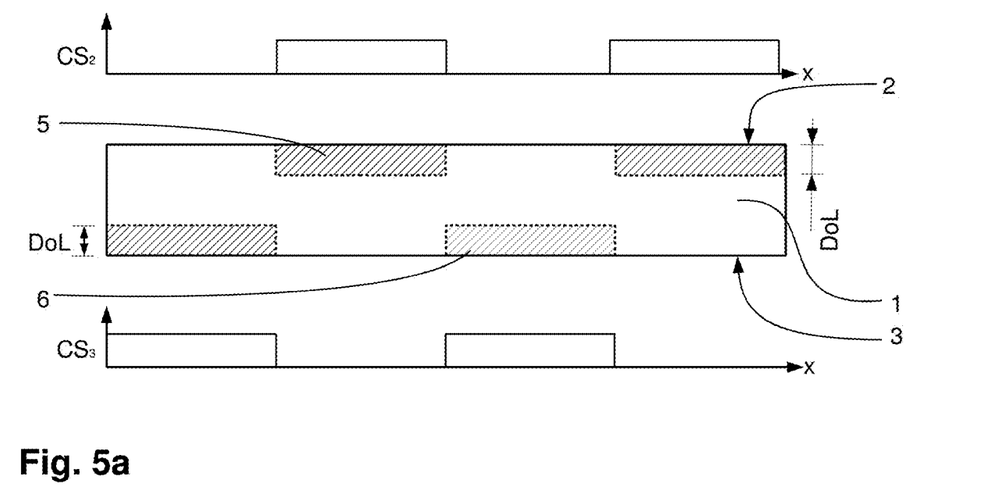
FIG. 5a is an ultrathin glass article with stripe patterned ion-exchange surface layers on both surfaces.
Figure 5B:
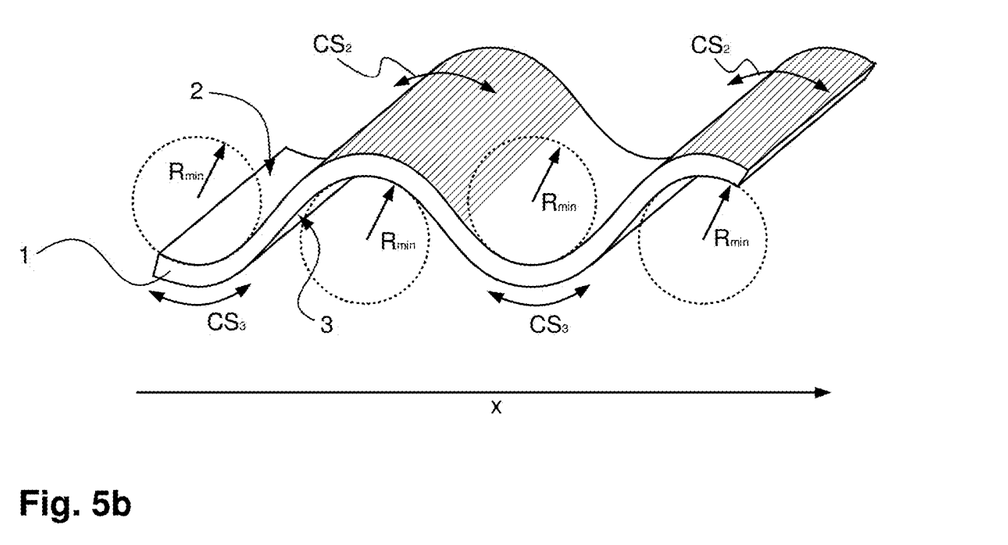

FIG. 5a shows another embodiment of the glass article 1 with a stripe patterned surface layer 5 on surface 2 and a stripe patterned surface layer 6 on surface 3. $DoL_2(x)$ and $DoL_3(x)$ are described by a periodic rectangle function. $DoL_2$ is shifted in x-direction by half a period length with respect to $DoL_3$ such that each area with a $DoL_{max}$ is opposed on the other surface by $DoL=0$. The alternating surface stresses $CS_2$ and $CS_3$ are therefore unbalanced with respect to a surface parallel center-plane of the glass article 1. Such a configuration results in a corrugated or wave shaped glass article 1 as shown in FIG. 5b with 4 curved regions with alternating curvatures.

Figure 6:
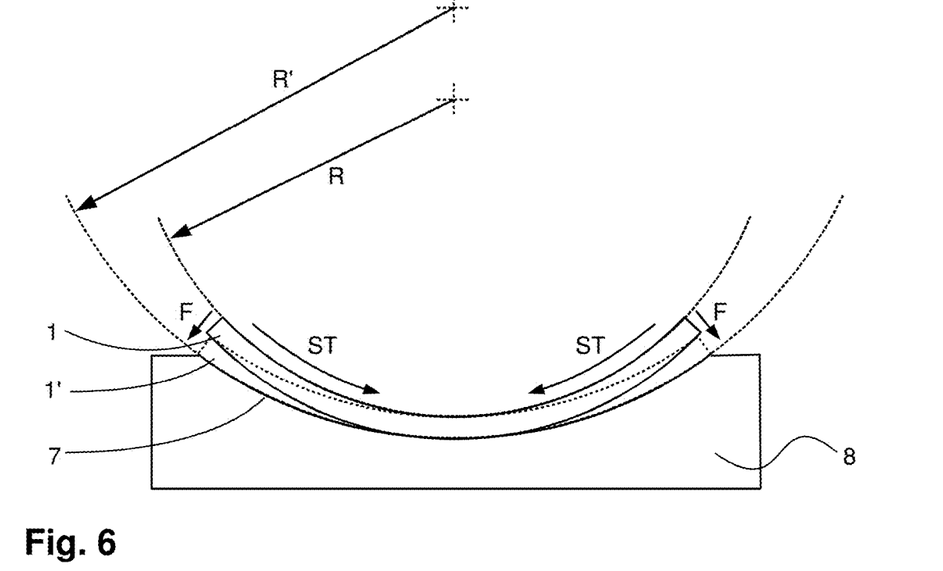
FIG. 6 is the lamination of the shaped ultrathin glass article with constant curvature radius to a target surface of a device with different curvature radius.

FIG. 6 shows the lamination of the glass article 1 with a constant curvature radius R to a target lamination surface 7 of a device 8 with a constant target curvature radius R'. The target curvature radius R' in this embodiment is larger than the curvature radius R of the glass article 1. During the lamination, the glass article 1 is forced out of its shape in order to fit the larger target radius R' by lamination forces F. The forces F induce a surface tensile stress ST on the surface of the glass article 1. Further tensile stresses are also induced at the edges of the glass article 1. These static stresses need to be maintained in a laminated configuration 1' in order to keep the glass article 1 out-of-shape. The lamination force can be provided e.g. by an Optical Clear Adhesive (OCA) between the target surface 7 and the corresponding surface of the glass article 1.

According to the invention, the shaped ultrathin glass article 1 can be laminated out-of-shape with very limited lamination forces resulting in very limited static stresses. As such, the shaped ultrathin glass article 1 can be produced at comparatively low precision since it can be adapted to its final high-precision shape in the laminated configuration 1' without running the risk of breakage during lamination or due to static fatigue.

Figure 7:
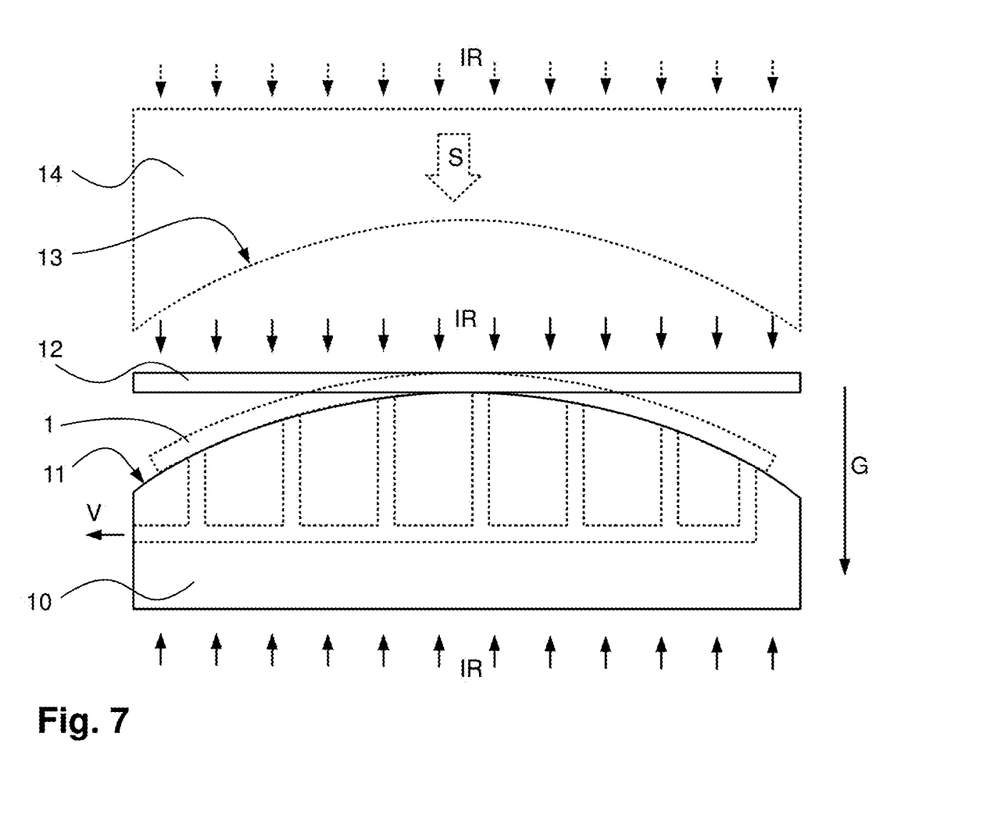
FIG. 7 is a thermal slumping and thermal bending setup for shaping the shaped ultrathin glass article.

FIG. 7 shows a configuration/method for shaping the ultrathin glass article 1 e.g. thermal slumping. A graphite mold 10 which has a molding surface 11 is used for shaping the glass article 1. The mold 10 can be produced at low precision and as such at low cost. The mold 10 is located underneath an ultrathin glass sheet 12 which is to be formed into the shaped glass article 1. The mold 10 and the ultrathin glass sheet 12 are heated by e.g. infrared radiation IR to temperatures of about 20-30° C. above the glass transition temperature $T_g$. The shaping time needed is approx. 2-5 min. for ultrathin glasses. Under the influence of gravity G, with assistance of a vacuum V applied at the mold surface 11 if necessary, the glass sheet 12 deforms and adapts to the molding surface 11. This process can be performed at low precision such that the curvature R of the finished shaped glass article 1 can deviate from the curvature of the molding surface 12.

In an alternative method for shaping the ultrathin glass article 1 (indicated in FIG. 7 by dashed lines), i.e. thermal bending, the ultrathin glass sheet 12 is sandwiched between the molding surfaces 11 and 13 of the mold 10 and an inversely shaped second mold part 14 which are forced against each other by a force S in order to bend the ultrathin glass sheet 12 into the desired shape. The parts 10 and 14 of the mold are heated similar to the above described thermal slumping.

Exemplary Embodiments

The glass compositions A, B and C as listed in the below Table 2 are used for the exemplary embodiments 1-6 as described below:

TABLE 2

Several exemplary glass compositions

| Composition | weight-% |
|---|---|
| Glass A | |
| $SiO_2$ | 64.0 |
| $B_2O_3$ | 8.3 |
| $Al_2O_3$ | 4.0 |
| $Na_2O$ | 6.5 |
| $K_2O$ | 7.0 |
| ZnO | 5.5 |
| $TiO_2$ | 4.0 |
| $Sb_2O_3$ | 0.6 |
| $Cl^-$ | 0.1 |
| Glass B | |
| $SiO_2$ | 61 |
| $B_2O_3$ | 10 |

TABLE 2-continued

Several exemplary glass compositions

| Composition | weight-% |
|---|---|
| Al$_2$O$_3$ | 18 |
| MgO | 2.8 |
| CaO | 4.8 |
| BaO | 3.3 |

Glass C

| | |
|---|---|
| SiO$_2$ | 62 |
| Al$_2$O$_3$ | 17 |
| Na$_2$O | 13 |
| K$_2$O | 3.5 |
| MgO | 3.5 |
| CaO | 0.3 |
| SnO$_2$ | 0.1 |
| TiO$_2$ | 0.6 |

Glasses A to C have the following selected properties:

TABLE 3

Parameters of glasses A to C according to Table 2

| Parameter | Glass A | Glass B | Glass C |
|---|---|---|---|
| CTE (20-300° C.) [10$^{-6}$/K] | 7.2 | 3.2 | 8.3 |
| T$_g$ [° C.] | 557 | 717 | 623 |
| Density [g/cm$^3$] | 2.5 | 2.43 | 2.4 |

CTE in Table 3 refers to the coefficient of thermal expansion and T$_g$ refers to the glass transition temperature.

Example 1

A sheet of 100 mm×60 mm was cut from glass A (see Table 2) with a thickness of 0.05 mm. The glass sheet was pasted with an ink mixed with KNO$_3$ powder by a screen printing method fully covering one of its surfaces. Subsequently, the sheet was dried at 180° C. during 1 hour to remove the ink. After drying, the sheet was annealed at 330° C. for 2 hours to drive an ion-exchange process. As a result, the ultrathin glass sheet experienced a bending into a widely cylindrical curved shape with a curvature radius of 52 mm.

Example 2

A sheet of 100 mm×60 mm was cut from glass A (Table 2) with a thickness of 0.05 mm. The sheet was coated with an Indium Tin Oxide (ITO) film on one of its surfaces in order to prevent ion-exchange and was subsequently submersed into a KNO$_3$ salt bath. The ultrathin glass sheet was toughened at a temperature of 400° C. for 1 hour. The CS is approximately 270 MPa and the DoL is approximately 7 µm. As a result, the ultrathin glass sheet experienced a bending into a widely cylindrical curved shape with a curvature radius of 48 mm.

Example 3

A sheet of 100 mm×60 mm was cut from glass A (Table 2) with a thickness of 0.1 mm. The sheet was masked according to a regular stripe pattern. The sheet was then coated with an ITO-film, resulting in coated areas in order to prevent ion-exchange in the coated areas. After removing the masking, the ultrathin glass sheet was submersed into a KNO$_3$ salt bath and toughened at a temperature of 400° C. for 1 hour. This resulted in an ion-exchange in the uncoated areas and in no ion-exchange in the ITO-coated areas. The CS is approximately 270 MPa and the DoL is approximately 7 µm. As a result, the ultrathin glass sheet experienced an alternating bending with several curved areas into a wave shape.

Example 4

Samples of glass A were drawn directly from the glass melting furnace with unbalanced cooling to cause unbalanced annealing of the glass surfaces. Due to the resulting unbalanced surface compressive stresses, the ultrathin glass bends into a curved shape. The surface with the larger compressive stress thereby forms the convex side whereas the surface with the smaller surface compressive stress forms the concave side. An excess surface compressive stress of 60 MPa and a depth of annealed layer of 8 µm on a 50 µm thick ultrathin glass lead to a curvature radius of 190 mm. It is to be noted that the glass shaped by unbalanced annealing has different CS and depth of layer profiles as ion-exchanged glasses. The depth of the annealed layer is generally about ⅙ of the thickness of the glass. When fitting the bent glass to a curved surface with 150 mm curvature radius, the static stress is calculated to be 2.6 MPa. Over 99% of the shaped ultrathin glass articles produced by this process were laminated without breakage.

In comparison, the same unbalanced annealing causes an excess surface compressive stress of 90 MPa and a depth of layer of 83 µm for 0.5 mm thick glass, resulting in a bending radius of 1220 mm. Lamination attempts to a target curvature radius of 150 mm resulted in breakage of all samples.

Example 5

Samples of glass B (Table 2) with a thickness of 0.1 mm and 100 mm×100 mm surface area were thermally bent in an IR furnace at 780° C. for 15 min on a graphite mold with a 52 mm curvature. After bending, the curvatures of the samples were 52 mm. These shaped ultrathin glasses could almost all (99%) successfully be laminated to a curved target surface with a curvature radius of 50 mm without breakage. The static stress is calculated as 2.9 MPa, resulting in an extrapolated fatigue lifetime of more than 1 year. In a further example, a low precision tungsten carbide mold is used at the same thermal treatment condition to get a radius curvature of 50.5 mm, which is still 1% deviation from the target radius. When laminating to the 50 mm target, the resultant static stress is 0.7 MPa and the expected life time is over 5 years. The yield during laminating was 100% i.e. all samples could successfully be laminated to the target surface.

In comparison, samples of 0.7 mm thick glass B (Table 2) resulted in a curvature radius of 58 mm under the same forming conditions. The lamination to 50 mm radius curvature surface leads to a static force of 70 MPa. Lamination could not be achieved due to the high de-lamination force.

In a further comparison, laminating of flat, i.e. having vanishing curvature radius, ultrathin glass samples with a thickness of 0.1 mm to a 75 mm target curvature radius leads to a yield of about 90% due to breakage of some samples. The static stress is calculated to about 50 MPa. Furthermore, over 80% of these samples break after 1 day which is presumably due to the high static stress that amounts to approx. 30.2% of the average breakage strength.

Example 6

Samples of glass C (Table 2) with a thickness of 0.1 mm and 100 mm×30 mm surface area were coated with a SiO$_2$ coating on one surface and then submersed in a molten KNO$_3$ salt bath at 390° C. for 30 min. The resulting glass article receives a curvature radius of 36 mm due to unbalanced ion-exchange since the SiO$_2$ coating slows down the ion-exchange rate. The uncoated surface becomes the convex side and has a surface compressive stress (CS) of 730 MPa and depth of ion-exchanged layer (DoL) of 11 µm, whereas the coated surface has a lower CS of 500 MPa and DoL of 6 µm. This shaped ultrathin glass article has a high bending strength due to the ion-exchanged surface layers. When laminating to a curved display with a target curvature radius of 35 mm, the yield is 100%. The calculated fatigue lifetime is higher than 10 years due to a low static stress of 3.6 MPa and extremely high breakage strength of 1131 MPa, as shown in FIG. 1. The static stress is only 0.3% of the breakage strength.

Table 4 below summarizes several parameters of the embodiments according to Examples 4 to 6, and three comparative examples:

TABLE 4

Summary of parameters

|  | Glass type | Thickness (mm) | Surface area (mm × mm) | Curvature radius R (mm) | Target radius R' (mm) | Average Breakage stress (MPa) | Young's modulus (GPa) | Static stress if laminated (MPa) | Lamination yield | Static stress vs. average breakage | Fatigue life |
|---|---|---|---|---|---|---|---|---|---|---|---|
| Comp. samples | Soda-lime | 0.5 | 100 × 100 | flat | 100 | 124 | 73 | 182.5 | 0 | >100% | 0 |
|  | Glass B | 0.05 | 100 × 100 | flat | 50 | 173 | 74.8 | 37.4 | 9% | 21.6% | <10 days |
|  | Glass B | 0.1 | 100 × 100 | flat | 75 | 165 | 74.8 | 49.9 | 90% | 30.2% | <1 day |
| Ex. 4 | Glass A | 0.05 | 100 × 100 | 190 | 150 | 170 | 72.9 | 2.6 | 99% | 1.5% | >1 year |
| Ex. 5 | Glass B | 0.1 | 100 × 100 | 52 | 50 | 165 | 74.8 | 2.9 | 99% | 1.7% | >1 year |
|  | Glass B | 0.1 | 100 × 100 | 50.5 | 50 | 165 | 74.8 | 0.7 | 100% | 0.4% | >5 years |
| Ex. 6 | Glass C | 0.1 | 100 × 30 | 36 | 35 | 1131 | 74 | 3.6 | 100% | 0.3% | >10 years |

What is claimed is:

1. A shaped ultrathin glass article, comprising:
two surfaces;
one or more edges joining the two surfaces;
a thickness between the two surfaces; and
at least one curved area with a non-vanishing surface curvature with a minimal curvature radius (R) when no external forces are applied, wherein that the glass article is bendable out of shape to a target minimal curvature radius R'≠R in the curved area without breakage, resulting in a non-vanishing static surface tensile stress in the curved area so that a resulting static surface tensile stress is not greater than $$1.15 \cdot \text{Min}\left(\overline{\sigma}_a - \Delta_a 0.4 \cdot \left(1 - \ln\left(\frac{A_{ref}}{A_{App}}\Phi\right)\right), \overline{\sigma}_e - \Delta_e 0.4 \cdot \left(1 - \ln\left(\frac{L_{ref}}{L_{App}}\Phi\right)\right)\right)$$

$L_{ref}$ is the stressed edge length and
$A_{ref}$ is the stressed surface area of the side faces of ultra-thin glass samples,
$\overline{\sigma}_a$ being the median of the tensile stress of samples of the ultra-thin glass upon break of the samples, where the break occurs within a side face of the samples within the stressed surface area,
$\overline{\sigma}_e$ is the median of the tensile stress of samples of the ultra-thin glass upon break of the samples, where the break emanates from an edge of the samples within the stressed edge length,
$\Delta_e$ and $\Delta_a$ being standard deviations of the tensile stress upon break of the samples at the edge or within a side face of the samples, respectively (i.e. the standard deviations of the median values $\overline{\sigma}_e$, $\overline{\sigma}_a$),
$A_{app}$ being the surface area of one side face of the ultra-thin glass and
$L_{app}$ being the cumulated edge length of the longitudinal edges of the ultra-thin glass, and
Φ being a specified maximum rate of breakage within a time interval of at least half a year.

2. The shaped ultrathin glass article according to claim 1, wherein the at least one curved area has a curvature that is one-dimensional with a constant curvature in one surface direction.

3. The shaped ultrathin glass article according to claim 1, comprising an alkali containing glass composition.

4. The shaped ultrathin glass article according to claim 1, wherein the thickness is equal or less than 0.4 mm.

5. The shaped ultrathin glass article according to claim 1, wherein the at least one curved area extends over an entirety of the two surfaces.

6. The shaped ultrathin glass article according to claim 1, wherein the at least one curved area comprises a plurality of curved areas.

7. The shaped ultrathin glass article according to claim 1, wherein the minimal curvature radius (R) is equal or smaller than 5000 mm and equal or larger than 1 mm.

8. The shaped ultrathin glass article according to claim 1, wherein the at least one curved area is formed by a non-precision-forming process selected from the group consisting of thermal bending, thermal slumping, thermal molding, and unbalanced surface compressive stressing.

9. The shaped ultrathin glass article according to claim 1, wherein the at least one curved area is a result of unbalanced surface compressive stressing.

10. The shaped ultrathin glass article according to claim 9, comprising a surface compressive stress in the at least one curved area on one of the two surfaces that is larger than the surface compressive stress on the other of the two surfaces, wherein the larger surface compressive stress lies in a range from 10 MPa to 1200 MPa and the smaller surface compressive stress amounts to at most 90% of the larger surface compressive stress.

11. The shaped ultrathin glass article according to claim 9, wherein the unbalanced surface compressive stressing comprises unbalanced annealing of the two surfaces and/or unequal ion-exchanged surface layers of the two surfaces.

12. The shaped ultrathin glass article according to claim 9, where the unbalanced surface compressive stressing comprises an ion-exchanged surface layer having a depth of layer (DoL) in a range from 1 µm to 50 µm at the one of the two surfaces that has the larger surface compressive stress.

13. The shaped ultrathin glass article according to claim 1, where the maximum rate of breakage Φ is less than 0.1.

14. The shaped ultrathin glass article according to claim 1, further comprising a deviation of the target curvature radius R' from the curvature radius R of up to 50%.

15. The shaped ultrathin glass article according to claim 1, further comprising a ratio of the resulting static surface tensile stress in the curved area and an average breakage stress of the ultrathin glass article that is equal or lower than 20%.

16. The shaped ultrathin glass article according to claim 1, wherein the resulting static surface tensile stress in the at least one curved area is less than 75 MPa.

17. The shaped ultrathin glass article according to claim 1, further comprising a target surface the at least one curved area, the target surface being laminated onto one of the two surfaces.

18. The shaped ultrathin glass article according to claim 9, wherein the at least one curved area comprises a surface compressive stress on one of the two surfaces that is larger than the surface compressive stress on the other of the two surfaces.

19. The shaped ultrathin glass article according to claim 9, wherein the at least one curved area comprises an ion-exchanged surface layer having a depth of layer (DoL) on one of the two surfaces that is larger than the depth of layer on the other of the two surfaces.

* * * * *